United States Patent Office 3,523,880
Patented Aug. 11, 1970

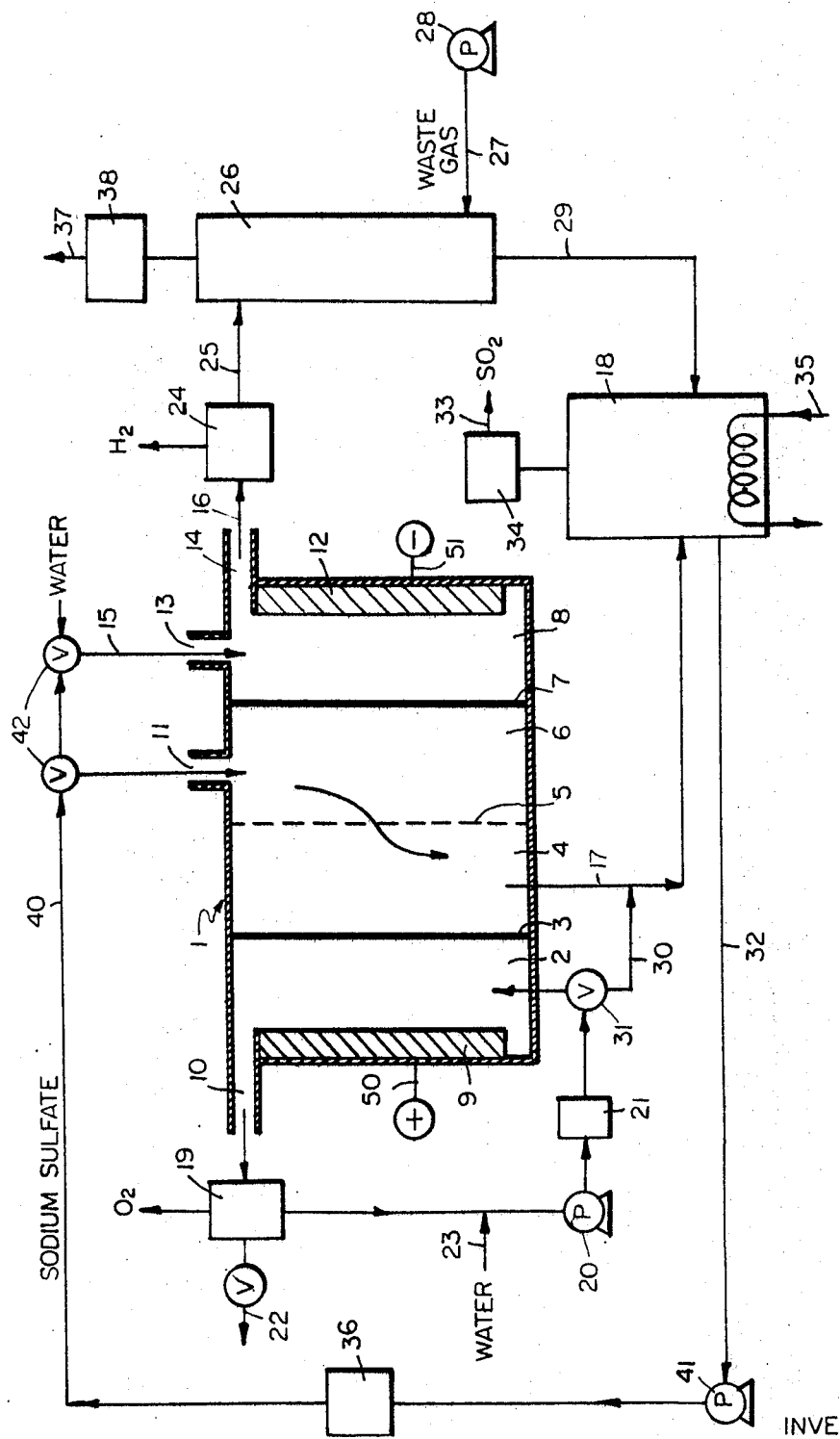

3,523,880
ELECTROLYTIC CELL FOR REMOVAL AND
RECOVERY OF SO₂ FROM WASTE GASES
Edgardo J. Parsi, Watertown, Mass., assignor to
Ionics, Incorporated, Watertown, Mass.
Filed Dec. 27, 1967, Ser. No. 693,903
Int. Cl. C01b *17/56;* B01d *13/02;* B01k *3/00*
U.S. Cl. 204—180    7 Claims

ABSTRACT OF THE DISCLOSURE

This invention relates to a four compartment electrolytic cell for converting a solution feed into its corresponding acid, acid salt and caustic solution for use in connection with a liquid with a liquid $SO_2$ absorption system. The caustic produced absorbs the $SO_2$ gas and on exhaustion is neutralized with the acid salt to reform the original salt feed solution. The desorbed $SO_2$ gas is collected and the salt solution recycled as feed to the cell. The acid produced in the anode compartment of the cell as removed from the scrubber system in an amount which is sufficient to maintain the reformed salt feed solution substantially neutral in pH.

This invention is related to improvements in the processes and apparatus for the removal and recovery of acidic gases such as sulfur dioxide from dilute gaseous mixtures. In particular it concerns the use of a four compartment electrolytic cell for converting an electrolytic sulfate salt solution into its corresponding acid, acid salt and base. Specifically it relates to an electrolytic cell designed to lessen the degree of corrosion of the anode electrode and which may be further designed to isolate and remove from the overall scrubber system a portion of the electrolytically produced acid.

In a co-pending application of W. A. McRae et al., Ser. No. 625,149 filed Mar. 22, 1967, now Pat. No. 3,475,122 there is disclosed, inter alia a three compartment electrolytic cell which is employed in a process for removing an acidic gas such as sulfur dioxide from waste stack gases so as to lessen atmospheric pollution.

The main components of the three compartment electrolytic cell are arranged in the order of an anode compartment, a porous diaphragm, a center compartment, a cation-transfer membrane and a cathode compartment. Liquid flow directing spacers provide the compartments and also provide the required gasketing of the components. One hydraulically non-porous cation membrane is used so that the liquid flowing to the cathode compartment can be independently controlled. The membrane prevents physical mixing of the catholyte and center compartment streams, making it easier to control the concentration of caustic generated. Essentially, only sodium ions from the center compartment pass through the cation membrane to balance the hydroxyl ions produced at the cathode. The center stream leaves the center compartment only by passing through the porous diaphragm into the anode compartment. This constant hydraulic flow greatly aids in preventing the hydrogen ions produced at the anode from competing with the sodium ions migrating across the cation-transfer membrane. The salt feed stream which enters the cell's center compartment must leave the cell from the anode compartment along with any acid or acid salt produced.

The invention disclosed in Ser. No. 625,149 is a continuous, cyclic liquid phase absorption process comprised of four basic steps. The first step employs the above described 3 compartment electrolytic cell for converting a center compartment feed solution of an alkali metal sulfate salt into sulfuric acid and/or an acid sulfate salt and a caustic solution. The second step involves the use of a tower for absorption of the sulfur dioxide gas from a stack or waste gas stream into the catholytic caustic solution to form predominantly a bisulfite solution. The third step is directed to neutralizing this spent caustic (bisulfite solution) with the acidic effluent solution from the cells anode compartment to reform the original alkali metal sulfate. The desorbed $SO_2$ gas resulting from the neutralization is stripped off and recovered as a valuable product. In the final fourth step the reformed sulfate salt solution is recycled as a feed solution back to the center compartment of the electrolytic cell where it is once again converted into its acidic and basic components.

Since equivalent amounts of acidic and basic materials are inherently generated by the electrolytic cell, there is under ideal conditions no necessity for adding or removing chemicals from the overall system except of course the sulfur dioxide which is fed into the system as a diluted gas and removed and recovered from the system as a concentered gas. In practice however it has been found that the total amount of sulfur dioxide ($SO_2$) fed into the system via the waste gas is generally greater than the total amount of concentrated $SO_2$ gas which is stripped and recovered from the overall system. This difference or loss of $SO_2$ gas is believed to be due to the oxidation of a minor portion of the incoming $SO_2$ gas to $SO_3$ (sulfur trioxide) and eventually to sulfuric acid. For example, 97% of the total $SO_2$ fed into the system may be recovered from the stripper tank as concentrated $SO_2$ gas with the other 3% being oxidized to the acid which remains in the system to upset the stoichiometric balance. Oxidation is possible whenever oxygen is available and in contact with the $SO_2$ gas especially in the liquid phase in the presence of catalytic materials. The major source of oxygen entering the system comes into the absorber tower as a component of the $SO_2$ containing stack gases. At this point the absorption of the $SO_2$ by the caustic will occur first but further contact over and above that required to remove the $SO_2$ gas will produce excessive oxidation. Generally it is very difficult to control the absorption time to a point where oxidation is completely prevented. Another source of oxygen or oxidizing agents which may enter the system comes from the electrolytic reaction occurring at the anode. In the electrolytic reaction, oxygen and other strong oxidizing agents (such as chlorine) are produced at the anode and removed therefrom as an evolved gas. Some oxygen gas or other oxidation products will remain dissolved in the anolyte solution which in the use of the three compartment cell system is eventually passed to the neutralizer or stripper tank where contact with desorbed $SO_2$ will occur to result in additional $SO_2$ oxidation. It is believed that metals such as Va, Fe, CO, Cu, Mn, etc. which may enter the system from various sources can act to catalyze the oxidation reaction.

The oxidation of the $SO_2$ gas by whatever means will build-up excess acid into the overall system so that the reformed sulfate salt solution resulting from the neutralization step will have an acid pH. It is highly desirable that the sulfate solution be close to the neutral point before it is recycled back as feed to the center compartment of the electrolytic cell. This excess acid upsets the stoichiometric balance and must be removed from the system or alternatively neutralized by the addition of an outside source of base.

It is therefore an object of the present invention to provide an improved cyclic electrolytic process for the liquid absorption of acidic gases whereby the sulfate feed solution to the electrolytic cell is maintained essentially neutral without the addition of an outside source of chemicals.

Another object is to provide a process for the removal of acid from the overall scrubber system which is substantially equivalent to the amount of acid produced from the oxidation of the $SO_2$ gas.

Another object is to provide an electrolytic cell which will lessen the degree of anodic attack.

Another object is to provide an electrolytic cell which does not add dissolved oxygen and other anodically formed oxidation products to the neutralized tank.

Another object is to provide an electrolytic cell whereby the anolyte stream is isolated from the overall cyclic scrubber system to allow for rapid recirculation of the stream to increase cooling and removal of gaseous oxygen therefrom.

Another object is to provide an electrolytic cell which will control the ratio of acid to acid salt produced and allow the removal of at least part of the acid from the overall gas scrubbing system.

A further object is to provide a four compartment electrolytic cell which is separate and independently controlled from a multi-cell electrolytic salt conversion apparatus to allow controlled production and removal of acid from the overall scrubbing system.

Various other objects and advantages will be apparent to one skilled in the art upon reading the following disclosure and the novel features will be particularly pointed out hereinafter in connection with the appended claims. It is understood that the details may be modified without departure from the principles of the invention which is readily understood when taken in connection with the accompanying drawing. For the purpose of simplicity the various valves, flowmeters, pressure gauges, pumps, switches, etc. which one skilled in the art might employ are not all fully illustrated in the drawing which is a diagrammatic representation of a simple absorbtion and regenerative system employing the principles of the four compartments electrolytic cell.

The process for carrying out the invention will be described by way of example by reference to the apparatus shown schematically in the drawing and in particular to the employment of sodium sulfate as the electrolyte feed solution to the electrolytic cell. In the practice of the invention, a substantially neutral feed solution of sodium sulfate is passed from line 40 by pump 41 to the electrolytic cell 1 through liquid control valves 42. By means of a source of direct current passed to the cell through leads 50 and 51 (source not shown) the sodium sulfate is split resulting in the formation of sulfuric acid, sodium acid sulfate and sodium hydroxide. The electrolytic cell 1 is of the type having four compartments, wherein the partition between the anode compartment 2 and the acid sulfate compartment 4 is an ion-permeable, substantially water or liquid impermeable membrane 3 which may be either cation-selective, anion-selective or neutral in selectivity. Separating the acid sulfate compartment 4 from the feed compartment 6 is a diaphragm 5 of controlled porosity. Between the cathode compartment 8 and the feed compartment 6 there is a cation-selective ion-exchange membrane 7. The membranes 3 and 7 prevents bulk mixing of the electrode solutions and the respective adjacent compartment solutions. The diaphragm 5 is of a design that will allow passage of electrolyte solution therethrough and is preferably of such suitable acid-resistant microporous materials as, for example, rubber, ceramic, polyethylene, canvas, asbestos, Teflon and other synthetic fabrics.

The cation permselective, ion-exchange membranes are commonly of the type consisting of a cation exchange substance prepared in the form of thin sheets; said membranes being substantially hydraulically impermeable to water and to ions carrying a negative charge but permeable to ions carrying a positive charge. The art contains many examples of cation exchange materials which can be formed into cation permselective membranes. Preferable cation membrane 7 is a self supporting carboxylic acid type membrane such as that described in U.S. Pat. No. 2,731,408. Carboxylic membranes, per se, are manufactured by copolymerizing divinyl benzene and an olefinic carboxylic compound such as an anhydride, ester or acid chloride of acrylic acid and its derivatives in solution in a suitable solvent. The polymerized solid material is saturated with water or an aqueous solution of an acid or base to convert the anhydride, ester or acid groupings in the polymeric matrix to salt or acid forms of carboxylate groups (—COO or —COOH). The polymerized solids are most useful where the solvent of polymerization in the polymerized solid is replaced by water. The presence of an aqueous solvent phase in the polymerized solid provides a solid structure which is electrically conductive and selectively permeable to cations. A cation permselective membrane of high selectivity is desired because the production of pure caustic soda in the cathode chamber is determined by the degree to which hydroxyl ions are prevented from migrating through the membrane. For example if the carboxylic membrane is 75% selective then only one mol of hydroxyl ions is transferred into the center chamber for every four moles of hydroxyl ions produced at the cathode.

As mentioned hereinabove hydraulically impermeable membrane 3 may be a cation-perselective membrane, an anion-permselective membrane or where so desired a neutral (non-selective) membrane. Where a cation membrane is employed it is preferably of the sulfonic acid type such as is fully disclosed in U.S. Pat. No. 2,731,411. Anion-permselective membranes are substantially hydraulically impermeable to water and to ions carrying a positive charge but readily permeable to ions carrying a negative charge. The manufacture and properties of anion-permselective membranes are well known in the art and are disclosed in U.S. Pats. Nos. 2,730,768, 2,800,445, 2,860,096, and others. The so-called neutral membranes are those which are non-ionic selective but ion-permeable. These membranes are often designated as semi-permeable and have the ability to pass both anions and cations freely during electrodialysis. Such membranes include water-insolubilized bibulous films or coatings of cellulose ethers such as methyl cellulose ethers, hydroxyethyl cellulose ethers and mixed methyl hydroxyethyl cellulose ethers. Other suitable semi-permeable membranes are the regenerated cellulose materials such as cellophane. In addition to the cellulose based films of polymers prepared by interpolymerizing a difunctional vinyl monomer, e.g. divinylbenzene with a non-ionic hydrophilic monomer can also be used. Suitable non-ionic monomers may include the vinyl ethers, vinyl alcohols, N-vinyl pyrrolidone and substituted derivatives. Semipermeable synthetic membranes are available in commerce under the trade names Nalfilm D–20 and Nalfilm D–30.

The anode compartment 2 is provided with an acid resistant anode 9 (for example, lead, lead alloys or silver, antimony and tellurium, tallium, chilex, tungsten bronze, platinum or platinum-coated electrolytic valve metals), and an outlet 10 for the anolyte effluent products. The feed compartment 6 contains an inlet 11 through which the electrolyte sulfate feed solution is introduced.

The cathode compartment 8 defined from the feed compartment 6 by the cation exchange membrane 7 is provided with a caustic resistant cathode 12 such as copper, lead, nickel, iron or steel and an inlet 13 through which electrolyte or water is passed. Outlet 14 serves to withdraw the caustic catholyte effluent products. The diaphragm, membranes and electrodes may be separated from each other by thin, gasketed spacers (not shown) which form the fluid-containing compartments of the cell.

In operation, a solution of an electrolyte, for example, neutral sodium sulfate is introduced under pressure into the feed compartment 6 through inlet 11 at a rate and pressure which in its passage through the porous diaphragm 5 (as shown by the arrow) is sufficient to substantially prevent the anodically formed hydrogen ions which enter the acid sulfate compartment 4 from migrating to the cathode in competition with the passage of alkali metal cations into said cathode compartment. Simultaneously, electrolyte or water is passed into the cathode compartment via inlet line 15 at a rate depending on the concentration of caustic desired in the catholyte effluent product and on the impressed direct current employed. The combination of an alkali metal ion with an hydroxyl ion produced at the cathode by the electrolysis of water forms the corresponding hydroxide, for example, sodium hydroxide which is withdrawn through outlet line 16. The electrolytic solution in the feed compartment 6 now having been partially depleted of its positive ions (e.g. sodium) passes through the porous diaphragm 5 into the acid sulfate compartment 4.

In the embodiment which employs a cation-permselective membrane 3 to define the anode compartment 2 from the adjacent acid compartment 4 there will be within compartment 4 the combination of anionic groups (e.g. $SO_4^=$) with hydrogen ions. These hydrogen ions are produced by the electrolysis of water at the anode and readily migrate through the cation-selective membrane 3 into the adjacent compartment 4 to form a mixture of sulfuric acid and acid sulfate salt such as sodium bisulfate which is withdrawn from the compartment through outlet line 17 and passed to the neutralizer-stripper tank 18. Since cation-selective membrane 3 is not 100% efficient, that is, it is not completely selective to the transfer of only cations such as positively charged hydrogen ions, there will be some small transfer of negatively charged sulfate ions from the acid sulfate compartment 4 into the anolyte compartment 2 through the separating cation membrane. The sulfate ion transfer into the anolyte will form sulfuric acid which is passed into an acid holdup, gas-liquid separator apparatus 19 where the separation of the anodically generated gases such as oxygen is accomplished. The anolyte is then recycled back to the anode compartment by means of a pump 20 after first being passed through a filter 21 or other clarification means to remove any particulate matter which may be present. Sulfuric acid may be bled and removed from the recirculating anolyte stream at outlet line 22 in any amount desired which amount may be equivalent to al of the sulfuric acid generated by the oxidation of $SO_2$ gas within the overall system and especially within the absorber equipment. Make up water may be fed in the anolyte stream via line 23 to replenish the water decomposed by the electrolytic anodic process and water which is lost with the removal of the sulfuric acid anolyte.

The effluent caustic product from the cathode compartment 8 is passed into the caustic holdup, gas-liquid separation tank 24, withdrawn through line 25 and introduced into the top of an absorber or scrubber tower 26 which may be of conventional design. Simultaneously, a gas stream containing an acid gas such as $SO_2$ is introduced into the bottom of the tower through inlet gas line 27 by means of a blower 28 or other means. It is at this point in the overall system where the undesirable $SO_2$ oxidation will mostly occur. The descending caustic absorbs the $SO_2$ gas and is recirculated if desired, then collected in the bottom of the tower. This spent caustic solution (mostly $NaHSO_3$) is carried away from the tower by outlet line 29 and passed into the neutralizer-stripping tank 18 where it is mixed with the incoming effluent solution from the acid sulfate compartment. The depleted $SO_2$ gas stream, after passing upwardly through the scrubber tower is removed at gas exit line 37 after passing through a liquid-gas separation apparatus 38 to remove entrained electrolyte droplets from the gas.

Within tank 18 the spent caustic will be neutralized by the entering acid sulfate solution which should be sufficiently acidic to stoichiometrically regenerate the original electrolyte feed solution of $Na_2SO_4$. If additional acidity is required it may be obtained from the sulfuric acid which is removed at outlet 30 from the anolyte recirculating loop via control valve 31. The resulting regenerated solution of $Na_2SO_4$ is removed from the neutralizer-stripper tank by line 32 and passed as feed back to the cell preferably as an essentially neutral solution. During the neutralization reaction the $SO_2$ is desorbed and recovered at exit line 33 as a concentrated gas stream after first passing through a moisture-gas separator apparatus 34. The removal of the $SO_2$ from the regenerated $Na_2SO_4$ solution can be accelerated by use of a boiler or heater 35 to strip away the evolved $SO_2$ gas. Other stripping means such as steam, vacuum, air or the like may also be employed in ways well known in the art. The regenerated sodium sulfate solution is preferably passed through a filter 36 or other particle removing means before being returned as the feed solution to the electrolytic cell in order to minimize plugging of the porous diaphragm.

It will be readily seen that the use of a four compartment cell which employs a substantially hydraulically impermeable, cation-selective membrane for separating the anode compartment from the next adjacent acid sulfate compartment has many advantages over that of the conventional three compartment cell as disclosed in the herein before mentioned copending application No. 625,149. Some of these advantages may be enumerated as follows:

(1) The membrane hydraulically isolates the anolyte solution from the remainder of the cell making it possible to recirculate the anolyte stream at a fast rate to provide increased cooling and more efficient removal of oxygen gas from the vicinity of the anode. Further, any dissolved oxygen or other anodically produced oxidation products is retained in the anolyte recirculating loop and does not become part of the acidic solution passed into the neutralizer since as previously mentioned, any oxygen entering the neutralizer tank can cause additional oxidation of $SO_2$.

(2) The cation selective membrane protects the anode electrode from contact with aggressive negatively charged ions which may enter the cell as a contaminant of the $Na_2SO_4$ feed solution. These ions such as chlorides, nitrates etc. will have difficulty migrating through the cation-selective membrane and into the anolyte solution to cause erosion of the anode material. Additionally, where lead or lead alloys are used as the anode material the sulfuric acid environment of the anolyte is more favorable to the formation of a longer lasting lead dioxide protective coating on the anode than that possible with sodium bisulfate as is the case in the three compartment cell. Also any particles of lead or lead compounds which may slough off from the anode cannot contact the porous diaphragm to plug the pores therein. Such particles may be removed from the anode compartment by rapid recirculation of the anolyte stream through a filter or the like which is placed in the anolyte recycle line.

In the event that the above described cell does not remove the required amount of acid from the system a further embodiment is contemplated using a neutral membrane to separate the anode compartment from the adjacent acid sulfate compartment. This would allow an increase in the ratio of sulfate ion to hydrogen ion transfer over that of the cation selective transfer membrane. If this system generates more acid in the anolyte than that produced by the undesired oxidation of $SO_2$ so that the overall system becomes too basic; than anolyte can be passed into the neutralizer tank through flow control means such as a control valve 31.

The use of an anion selective membrane barrier in place of a neutral membrane will further increase the ratio of sulfate to hydrogen ion transfer through the barrier. Such an arrangement would make it possible to generate a high percentage of sulfuric acid so that for example about 40% of the total acidic compounds produced by the cell would be recovered from the anolyte stream as sulfuric acid with the remainder recovered as the acid salt from the adjacent acid sulfate compartment.

Although the invention has been described in connection with a single electrolytic cell it will be understood that for practical and commercial applications a multiplicity of such cells will be required to form a the electro lytic conversion apparatus or stack. These stacks may comprise a plurality of three compartment cells of the type previously described or four compartment cells which preferably employ a cation exchange membrane adjacent to the anode compartment or a combination of such stacks. Common electrodes may be used advantageously in the multicell stacks in place of single electrodes where the materials of electrode construction can withstand both anodic and cathodic attack. In common electrodes both sides of the electrode are taking an active part in the electrolytic process in contrast to single electrodes in which only a single side is actively involved. A stack will comprise a plurality of repeating single electrolytic cells placed adjacent to each other in a stack arrangement wherein each electrode is placed common to two individual cells or units with the cathode and anodes arranged throughout the stack in an alternative fashion. The electrodes at the two terminal ends of the stack are employed as single electrodes and may be both anodes, both cathodes or obviously an anode and a cathode. A particularly advantageous multicell electrolytic stack is that described in copending application Ser. No. 625,149 utilizing bimetallic, bipolar electrodes placed common to two individual cells. A preferred electrode of the bimetallic type is one having a cathode surface on one side constructed of nickel and the other side of platinum.

To accomplish the removal of excess sulfuric acid from the overall system and to obtain any desired ratio of sulfuric acid production to acid sulfate only a small fraction of the total cells of a stack need be equipped with anion or neutral membranes. In a multicell type stack composed of a plurality of four compartment cells it may be desired that of the total hydrogen ions produced by the anodic reaction of all the cells about 4.2% be converted to sulfuric acid and removed from the system via the anolyte stream with the remaining 95.8% being retained in the system as the acid sulfate. If the cation-selective membranes which define the anode compartments are of high efficiency, that is 98% selective to hydrogen ion transfer, then approximately 5% of the number of cells in the stack need be equipped with an anion (or neutral) membrane where such anion membrane is only 40% efficient (selective) to sulfate ion transfer and 60% selective to hydrogen ion transfer. This percentage can be readily calculated from the following equation:

$$\frac{A}{100} = \frac{(1-M_1)N_1 + (1-M_2)N_2}{0.9(N_1+N_2)}$$

where:

0.9 is the net equivalents of acid and caustic per faraday produced in the cells, that is, 90% current efficiency;

$M_1$ is the hydrogen transfer efficiency of the cation-selective membranes;

$M_2$ is the hydrogen transfer inefficiency of the anion-selective membranes;

$N_1$ represents the number of cells with cation membranes facing the anodes;

$N_2$ represents the number of cells with anion membranes facing the anodes and

A is the percentage of the acid recovered from the anolyte compartments of the cells in the form of sulfuric acid.

Substituting and Solving:

$$0.042 = \frac{(1-0.98)N_1 + (1-0.60)N_2}{0.9(N_1+N_2)}$$

$$\frac{N_2}{N_1} = \frac{0.018}{0.36}$$

$$\frac{N_2}{N_1} = 0.05$$

$$= 5\%$$

Therefore to accomplish the removal from the system of the sulfuric acid fraction (4.2%) produced in the above described multicell stack only 5% of the total cells or five out of every hundred cells need be equipped with the above characterized anion selective membrane. An alternate arrangement is to place an anion type acid producing cell or stack separate from the main salt conversion stacks but hydraulically connected to the overall scrubber system. The liquid flow rate and impressed direct current to the acid cell may be controlled independently from the rest of the electrolytic system. This will allow the amount of sulfuric acid and the ratio of sulfuric acid to acid sulfate produced to be more accurately and easily controlled.

It is obvious that a separately placed four compartment acid producing cell or stack can also be operated in conjunction with the scrubber systems main salt conversion stacks where such stacks comprise a plurality of the previously described three compartment electrolytic cells. Since the three compartment cells do not have any acid removing capacity of their own it is necessary that the excess acid which will build up in the overall scrubber system be removed from the anolyte stream of the separately placed four compartment cell. This acid cell should preferably have means connected thereto such as control valves for separately controlling the rate of solution flow to the cell and a separate direct electric current source. The caustic produced by the cell would be added to the systems main caustic stream and the acid sulfate passed into the system's neutralization tank. The sulfuric acid would be withdrawn from the cell's anolyte effluent stream in whatever amount required. The feed solutions to the anode, cathode and feed compartment of the acid cell may be obtained by tapping off a controlled amount from the inlet streams which feed the system's main electrolytic salt conversion stack. Such an arrangement produces a closed liquid cyclic scrubbing system except for the volume of excess acid removed which is made up by addition of a liquid such as water.

pH meters may be employed to continuously record and monitor the pH level of the various aqueous solution within the overall scrubber system. The meters would be connected to liquid regulatory valves and the like to automatically control the amount of acid which is to be removed or added to the system to maintain the proper pH.

The following example shows by further illustration and not by way of limitation the cyclic method of absorbing $SO_2$ and the regeneration of the spent aqueous absorbent to form the original salt feed to the cell and the manner of employing acid generating electrolytic cells to allow the withdrawal of any excess acid buildup within the overall scrubber system.

EXAMPLE I

Two separate electrolytic stacks one containing nineteen cells and the other a single cell, both being of the heretofore described four compartment cells is used to convert a one molar aqueous solution of sodium sulfate into essentially sulfuric acid, sodium acid sulfate and sodium hydroxide. The nineteen cell stack is characterized by a 98% hydrogen efficient sulfonic acid type cation exchange membrane barrier separating the anode and acid salt compartments and the single cell stack by an anion exchange membrane separator having a 40% efficiency for sulfate ion transfer and 60% for hydrogen ions. The cells all have lead alloy anodes containing 2% silver with 1% tellurium and nickel sheet cathodes. The diaphragms are microporous polypropylene (10–20 micron pore size) and are physically supported on their anode facing side by polypropylene screen placed within the acid sulfate compartment. Screen material having a thickness of about two millimeters is similarly placed in the remaining compartments and essentially determines the spacing thickness of the compartments. The cation exchange membrane facing the catholyte compartments are the carboxylic type prepared from a mixture of divinyl benzene, ethyl styrene and acrylic acid. The peripheral edges of the compartments are fitted with synthetic plastic gaskets having a compressed thickness equal to about the thickness of the compartments. The one molar sodium sulfate solution is introduced into the feed compartments of the multi cell stack at a flow rate of about 37.9 liters per hour (about 2 liters per cell) and into the single cell stack at 1.57 liters per hour. The voltage required is about 5.5 volts D.C. per cell and the temperature of the cells is maintained at about 140° F. by recirculating both the anolyte and catholyte through heat exchangers. At steady state at a current density of 120 amps/ft.$^2$ the effluent from the acid sulfate compartments of the large stack is found to be about 0.96 molar in sodium acid sulfate at a total flow rate of about 39 liters per hour. The effluent from the single cell is 1.48 liters per hour of 0.76 molar sodium acid sulfate. At the cathodes 2 molar NaOH is produced and a total of about 20.2 liters per hour of this caustic is bled from the recirculating catholyte stream. Water is added as feed to the cathode compartments of both stacks in an amount sufficient to maintain the caustic effluent concentration at 2 molar. The anolyte solution is constantly recirculated through the anode compartments of both stacks as a one molar solution of sulfuric acid of which a combined total of about 0.87 liter per hour of acid is tapped off from the anolyte streams of both stacks and withdrawn from the scrubber system as a valuable by product. A total of 0.42 liter/hr. is removed from the large stack and 0.45 liter/hr. from the single cell stack. This total removed acid is substantially equivalent to the acid which is produced in the overall system by the oxidation of $SO_2$. The sulfuric acid removed from the anolyte of both stacks represents about 4.2–4.3% of the total acid or hydrogen ions generated by all the electrolytic cells. Water is added to the anode compartments to make up for the volume of sulfuric acid removed.

The 2-molar caustic solution removed from the recirculating caustic stream is contacted counter-currently with a simulated flue gas (0.3% by volume of $SO_2$) in an absorbtion column packed with polyethylene Raschig rings. The caustic and waste gas flows and the height of the packing are adjusted to remove about 90% of the $SO_2$ content of the waste gas to produce a liquid effluent comprising about 38.6 gram moles of $NaHSO_3$ and 0.87 gram moles of $Na_2SO_4$ per hour. The $Na_2SO_4$ formed represents the amount of $SO_2$ oxidation occurring during the absorbtion step and is about 2% of the total $SO_2$ passed into the system. The spent caustic solution from the column is mixed with the combined effluent solution from the acid sulfate compartments of both stacks to reform $Na_2SO_4$. The desorbed $SO_2$ is stripped from the resulting sodium sulfate solution by reboiling and is collected. The $Na_2SO_4$ solution is evaporated to a concentration of one mole per liter and the condensed water collected and passed as a make-up feed to the electrode compartments of both stacks. The sodium sulfate solution is found to be essentially neutral in pH and is passed to the feed compartments of all the cells to complete the cyclic process.

EXAMPLE 2

The two separate stacks of Example 1 are combined into a single stack comprised of twenty cells wherein nineteen cells contain the cation exchange barrier facing the anode and the remaining single cell containing the anion exchange barrier. A one molar solution of sodium sulfate is again passed into the 20 feed compartments of the stack at a total flow rate of about 39.5 liters per hour. The stack was operated at the same voltage, current density and temperature as in Example 1. At steady state the effluent from the acid sulfate compartment is found to be about 0.97 molar in sodium acid sulfate at a production rate of about 38.6 gram-moles per hour or 40.9 liters per hour. At the cathode 2 molar NaOH is produced and about 20.2 liters per hour of this caustic is bled from the recirculating catholyte stream. Water is added as feed to the cathode compartments in an amount sufficient to maintain the caustic effluent concentration at 2 molar. The anolyte solution is constantly recirculated through the anode compartments as a one molar solution of sulfuric acid of which about 0.87 liter per hour of acid is tapped off from the anolyte stream and withdrawn from the scrubber system as a valuable by product. This removed acid is substantially equivalent to the acid which is produced in the overall system by the oxidation of $SO_2$. The sulfuric acid removed from the anolyte represents about 4.2–4.3% of the total acid or hydrogen ions generated by the electrolytic cell. Water is added to the anode compartment to make up for the volume of sulfuric acid removed.

The 2 molar caustic solution removed from the recirculating caustic stream is contacted counter-currently with a simulated flue gas (0.3% by volume of $SO_2$) in an absorbtion column packed with polyethylene Raschig rings. The caustic and waste gas flows and the height of the packing are adjusted to remove about 90% of the $SO_2$ content of the waste gas to produce a liquid effluent comprising about 38.6 gram moles of $NaHSO_3$ and 0.87 gram moles of $Na_2SO_4$ per hour. The $Na_2SO_4$ formed represents the amount of $SO_2$ oxidation occurring during the absorbtion step and is about 2% of the total $SO_2$ passed into the system. The spent caustic solution from the column is mixed with the effluent solution from the acid sulfate compartment to reform $Na_2SO_4$. The desorbed $SO_2$ is stripped from the resulting sodium sulfate solution by reboiling and is collected. The $Na_2SO_4$ solution is evaporated to a concentration of one mole per liter and the condensed water collected and passed as a make-up feed to the electrode compartments of the multicell stack. The sodium sulfate solution is found to be essentially neutral in pH and is passed to the feed compartments of the cells to complete the cyclic process.

I claim:
1. A process for electrolytically converting aqueous salt solutions into their corresponding acid, acid salt and base in a four compartment cell having a first anode electrode compartment separated from its adjacent second acid salt compartment by an ion-permeable, substantially non-liquid permeable membrane, said second compartment separated from the adjacent third feed compartment by a liquid permeable, porous diaphragm and said feed compartment separated from the adjacent fourth cathode compartment by a cation selective ion-exchange membrane, the process comprising introducing a salt solution into the feed compartment while maintaining sufficient pressure therein to cause said salt feed solution to pass through said porous diaphragm into and out of the adjacent acid salt compartment, introducing an aqueous liquid into said cathode compartment and anode compartment, passing a direct electric current across the electrodes transversely through said compartments, diaphragm and membranes and removing as effluent products the corresponding acid, acid salt and base solutions from the anode, acid salt and cathode compartments respectively.

2. The process according to claim 1 wherein the feed salt solution is an alkali metal sulfate selected from the group consisting of sodium sulfate and potassium sulfate and wherein the products of the electrolytic conversion are essentially solutions of sulfuric acid, alkali metal bisulfate and alkali metal hydroxide.

3. The process according to claim 1 wherein the aqueous liquid introduced into said cathode compartment is water.

4. A cyclic scrubber process for the removal of $SO_2$ from gases containing the same which comprises the steps of:
   (a) employing the process of claim 1 to convert an alkali metal sulfate solution to its corresponding acid, acid sulfate salt and caustic solution which are removed as effluent products from the anode, acid salt and cathode compartments respectively of a four compartment electrolytic conversion cell;
   (b) contacting the $SO_2$ containing gas with the caustic catholyte effluent solution to absorb $SO_2$ from said gas with the formation of alkali metal bisulfite whereby said $SO_2$ absorbing caustic becomes spent;
   (c) combining said spent caustic solution mixture with the acid sulfate salt effluent of the cell whereby said neutralization reaction results in reforming alkali metal sulfate and desorbing sulfur dioxide;
   (d) withdrawing at least a portion of the anolyte acid effluent product and recycling the remainder of the anolyte solution back to the anode compartment; and
   (e) passing said reformed alkali metal sulfate back to the electrolytic cell as a feed solution to complete the cyclic process after first stripping off and collecting $SO_2$ therefrom.

5. The process according to claim 4 characterized in that the stripping of $SO_2$ gas is accomplished by reboiling of the reformed alkali metal sulfate solution mixture.

6. The process according to claim 4 characterized in that the acid withdrawn from the recycling anolyte solution is removed from the overall cyclic scrubber system in an amount which is sufficient to maintain the pH of the reformed sulfate feed solution substantially neutral.

7. The process according to claim 6 characterized in that the volume of acid withdrawn from the recycling anolyte solution is replaced by the addition of make-up water.

References Cited

UNITED STATES PATENTS

| | | | |
|---|---|---|---|
| 2,768,945 | 10/1956 | Shapiro | 204—72 |
| 3,135,673 | 6/1964 | Tirrell et al. | 204—98 |
| 3,165,460 | 1/1965 | Zang et al. | 204—301 |
| 3,222,267 | 12/1965 | Tirrell et al. | 204—98 |
| 3,344,050 | 9/1967 | Mayland et al. | 204—98 |
| 3,433,726 | 3/1969 | Parsi et al. | 204—180 |

HOWARD S. WILLIAMS, Primary Examiner

A. C. PRESCOTT, Assistant Examiner

U.S. Cl. X.R.

23—2, 178; 204—98, 104, 301